(12) United States Patent
Robert

(10) Patent No.: US 6,510,952 B1
(45) Date of Patent: Jan. 28, 2003

(54) DEVICE FOR STORING RECORDING MEDIA

(75) Inventor: Paul-Henri Robert, Boulogne Billancourt (FR)

(73) Assignee: Via Marques, Paris (FR)

( * ) Notice: Subject to any disclaimer, the term of this patent is extended or adjusted under 35 U.S.C. 154(b) by 0 days.

(21) Appl. No.: 09/743,410

(22) PCT Filed: Jul. 9, 1999

(86) PCT No.: PCT/FR99/01639

§ 371 (c)(1), (2), (4) Date: Jan. 10, 2001

(87) PCT Pub. No.: WO00/03394

PCT Pub. Date: Jan. 20, 2000

(30) Foreign Application Priority Data

Jul. 10, 1998 (FR) .............................................. 98 08869

(51) Int. Cl.⁷ .............................................. A47G 29/00
(52) U.S. Cl. ........................ 211/40; 211/41.12; D6/407; D6/453; D6/450
(58) Field of Search ............................... 211/40, 41.12; D6/407, 450, 453, 629

(56) References Cited

U.S. PATENT DOCUMENTS

| | | | |
|---|---|---|---|
| D338,573 S | * 8/1993 | Mattikow | D6/407 |
| D338,786 S | * 8/1993 | Mattikow | D6/407 |
| D365,488 S | * 12/1995 | Dardashti | D6/629 |
| 5,615,779 A | * 4/1997 | Marsilio et al. | 211/40 |
| 5,632,375 A | 5/1997 | Mattikow | 206/387.1 |
| 5,676,260 A | * 10/1997 | Schneidermesser | 211/40 X |
| D386,932 S | * 12/1997 | Chang | D6/453 X |
| D389,658 S | * 1/1998 | Holt | D6/632 |
| D400,751 S | * 11/1998 | Yung | D6/630 |
| 5,967,338 A | * 10/1999 | Rosario | 211/40 |

FOREIGN PATENT DOCUMENTS

| | | |
|---|---|---|
| DE | 91 10 569 U | 1/1991 |
| WO | 95/19036 | 7/1995 |

* cited by examiner

Primary Examiner—Daniel P. Stodola
Assistant Examiner—Erica B. Harris
(74) Attorney, Agent, or Firm—Young & Thompson

(57) ABSTRACT

A device for storing recording media includes an element for storing recorded media and decorative accessories. The device has an amusing appearance providing it with a toy-like aspect, and has a substantially rectangular housing having the width of the media to be stored, at the back of which cells are provided for receiving the recording media, which are, at least partly, embedded so as to be partly protected.

15 Claims, 5 Drawing Sheets

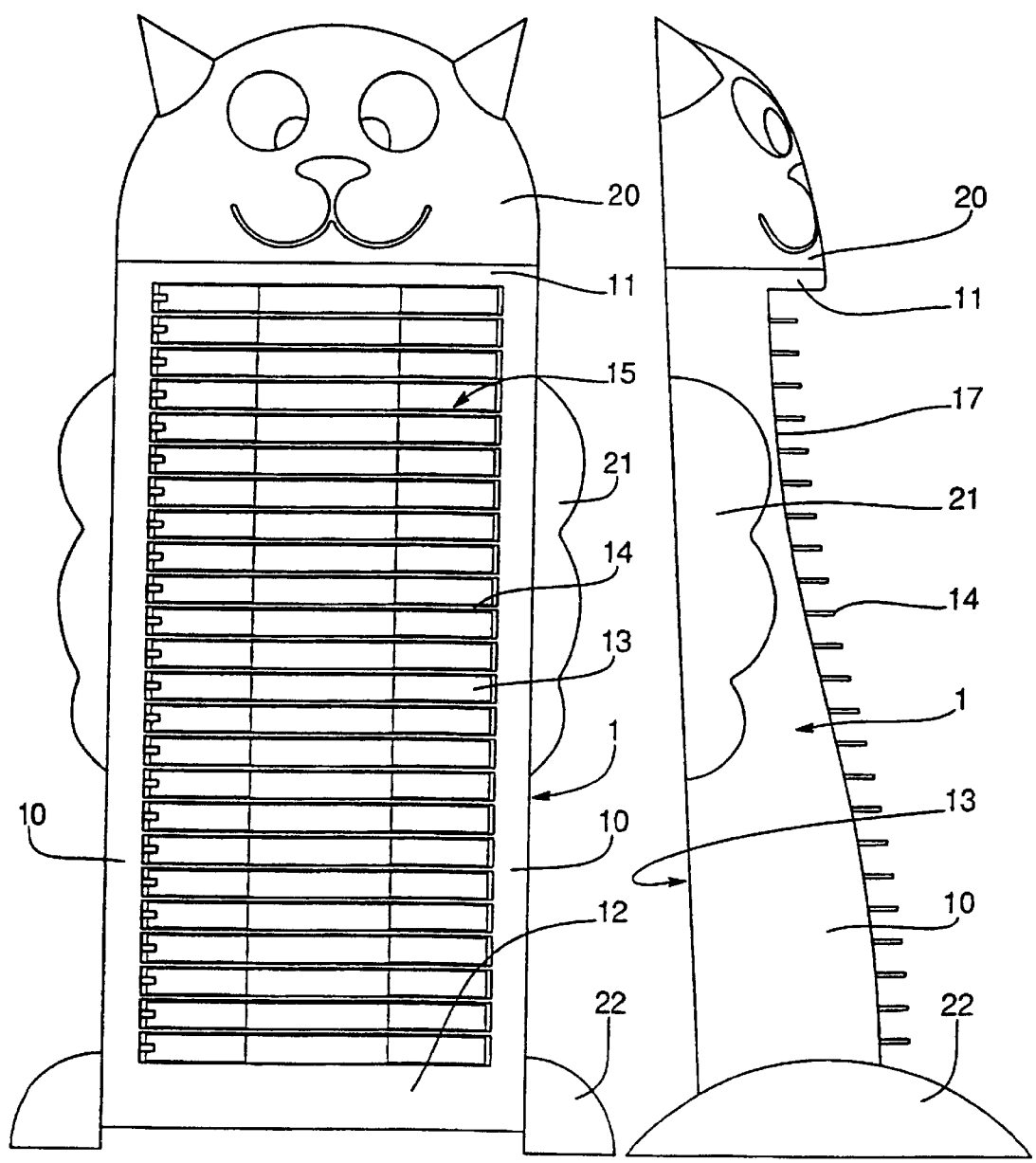

DEVICE FOR STORING RECORDING MEDIA

BACKGROUND OF THE INVENTION

The present invention relates generally to a device for storing recording media such as diskettes, cassettes, compact discs, often called laser discs or more simply "CD", no matter what the type of recording, digital, audio, photo, video or multimedia.

These recording supports are used more and more and, at present, almost all the world has a certain number of these for their computers, whether at home or at the office, near its hi-fi set or its video recorder and the requirement for having storage means is greater and greater.

To this end, numerous storage devices are now proposed on the market. These devices are usually present in the form of small sets of shelves comprising two parallel uprights, separators disposed parallel to each other between these uprights so as to form pockets in which can be inserted the boxes or sleeves protecting the recording media, and a bottom.

Numerous efforts are being made, especially as to storage devices adapted to be used for audio media, so as to provide devices adapted to constitute a decorative element integrating itself well into the interior decor of the place where the hi-fi set is disposed, generally the living room.

DE 91 10 569 provides storage devices in the form of a rectangular parallelepipedal frame of large height relative to its base and disposed vertically. The upper surface of the frame is shaped so as to simulate the roof of a dwelling.

This device has on its lateral surfaces regularly spaced horizontal ribs between which the compact disc housings must be inserted by sliding.

It will be seen that with such an arrangement, the housings are often subject to wedging during their storage or retrieval.

WO 95 19036 provides, for example, compact disc storage devices having the general appearance of a musical instrument, such as a guitar or a banjo. The device is constituted by a central portion constituted by a beam whose overall cross-section is a flattened Ω shape, open rearwardly of the device, disposed overall vertically and with flat decorative elements simulating the head or the neck, and body portions disposed on opposite sides of the strings. The two reversely curved portions that border the opening of the beam constitute stiffeners ensuring its rigidity. Cutouts simulating the frets disposed on the neck of the stringed instruments are provided in the front surface constituted by the closed portion of the beam; these cutouts are disposed perpendicular to the axis of the neck and are of a height such that a compact disc storage box can be inserted until it comes into bearing against the reversely curved portions of the beam.

The drawback of this device stems from the fact that the compact disc boxes positioned in the central storage portion of the device are not protected and can be subjected to shocks, and the same is possible if they fall from the storage device if they are pressed from the side.

Moreover, these storage devices still remain rather austere and serious in appearance.

The only attractive devices which exist are those described in U.S. Pat. No. 5,632,375, but these are playthings adapted to be manipulated by young children, in the body of which has been provided a window rendering accessible the interior of the plaything to permit the positioning of an audio cassette on which is recorded a story involving the plaything. Such playthings can contain only a very small number of cassettes and cannot be used to ensure their storage beyond the time of sale.

The applicant has thus sought to provide a storage device that will be more amusing so as to give a touch of humor to the serious world of compact discs and which will be such that the compact disc cases will be better protected from shocks so as to be able to be used in the living room as well as at the office or in the rooms of adolescents or even children who more and more frequently have their own hi-fi equipment.

SUMMARY OF THE INVENTION

To this end, the invention provides a device for storing recording media, constituted by an element permitting storage of recorded media and decorative accessories, characterized in that it is present in an amusing form giving the appearance of the plaything. The body of said plaything comprises a recess of substantially rectangular shape having the width of the recording media to be stored. At the bottom of the base are disposed pockets adapted to receive said recording media, which are, at least in part, surrounded so as to be partially protected.

The device according to the invention is further noteworthy in that the body comprises two longitudinal side surfaces, two transverse end surfaces, a bottom defining said recess and separators, disposed parallel to each other, defining between themselves the pockets, the accessories adapted to decorate the body give to the device the appearance of a real or imaginary being, the accessories adapted to decorate the body give the appearance of a vehicle, the accessories adapted to decorate the body give to the device the appearance of a tree, the accessory is a head, the accessory is an upper or forward member such as an arm, a hand or a front paw, the accessory is a lower or rear member such as a leg, a foot or a rear paw, the body and the accessories have complementary means to hook onto each other, disposed parallel to each other, so as to permit easy assembly and disassembly, the hooking means carried by the body are distributed over its longitudinal and transverse surfaces, the hooking means carried by the body are constituted by openings adapted to be traversed by lugs constituting the hooking means carried by the accessories, the body is rounded and simulates the body of a living creature, one of the transverse end surfaces of the body is of much smaller size than the other transverse surface.

BRIEF DESCRIPTION OF THE DRAWINGS

The invention will be better understood from the description which follows, given by way of non-limiting example, with reference to the accompanying drawings, in which:

FIG. 1 is a front view of a storage device according to a first embodiment,

FIG. 2 is a side view of the device of FIG. 1,

DESCRIPTION OF THE PREFERRED EMBODIMENTS

Figures 3, 4:
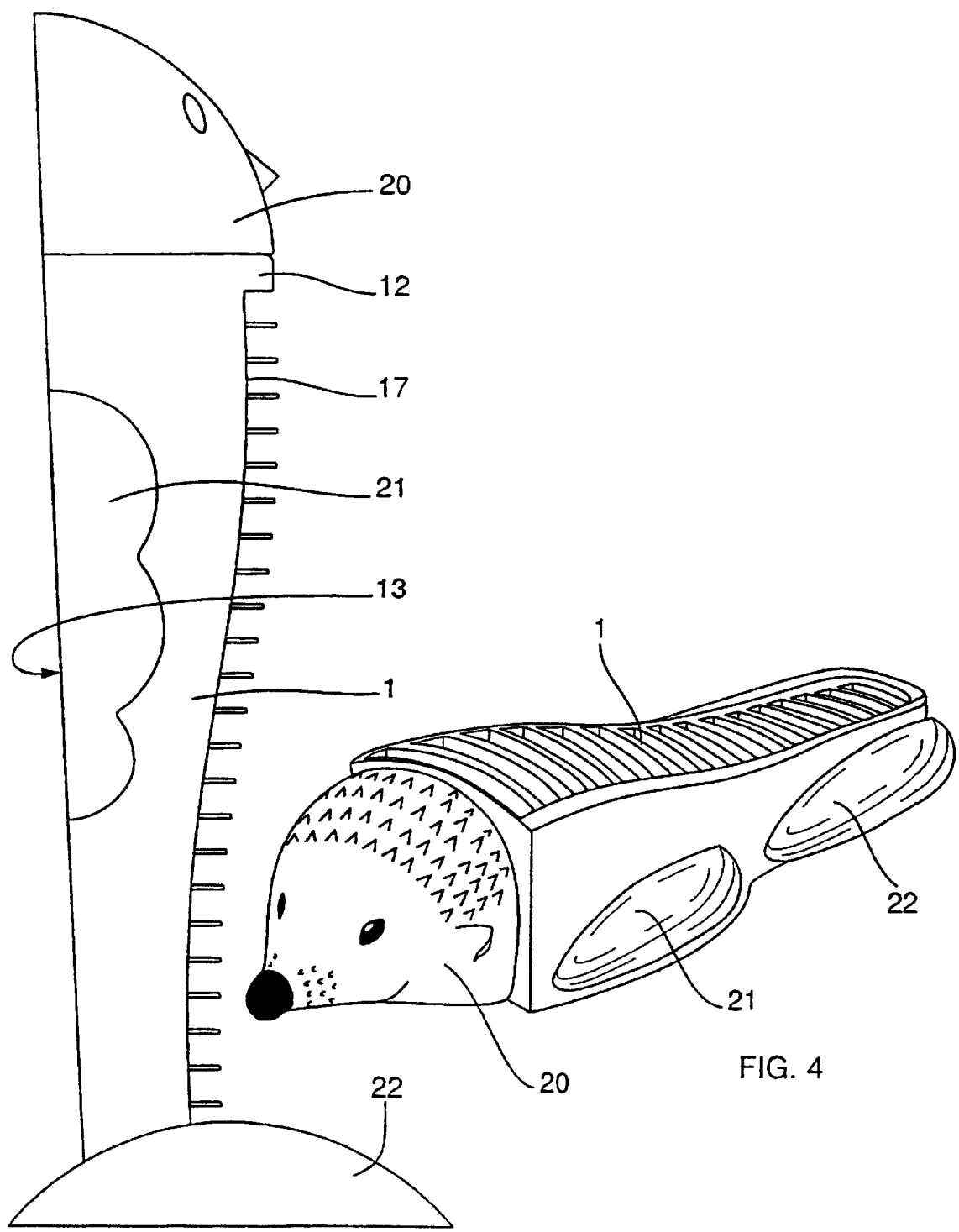
FIG. 3 is a side view of a device according to a second embodiment.
FIG. 4 is a perspective view of a device according to a third embodiment of the invention.

As is seen in the drawings, the storage device according to the present invention is in an amusing form giving it the appearance of a plaything. It can have the appearance of a real or imaginary living being, such as a person, an animal as shown in the drawings, an insect, a fish, a bird or even the aspect of a tree or a vehicle, etc.

So as to provide such a device without having to make a mold for each design, the device according to the invention is composed of an element permitting the storage of recorded media constituted by the body 1 of the plaything, on which are disposed decorative accessories such as a head 20, an upper or front member 21 for example an arm, a hand or a front paw, a lower or rear member 22, for example a leg, a foot or a rear paw. When it is desired to give to the device the appearance of a vehicle, the accessory 20 can be a hood and the accessories 21 and 22 wheels.

The body 1 comprises a recess of substantially rectangular shape having the width of the recording media to be stored, at the bottom of which are disposed pockets adapted to receive said recording media. By this arrangement, the cases of the recorded media are at least in part surrounded by the recess and hence protected from shocks and the risk of slippage.

To this end, it comprises two lateral longitudinal surfaces 10, two transverse end surfaces 11 and 12, a bottom 13, constituting the recess, and separators 14 disposed parallel to each other defining between them the pockets 15. In a manner known per se, and not shown in the drawing, pockets having different heights can be provided for the positioning of casings containing recording media that have different heights, as for example for compact discs that are disposed either in a cardboard slipcase or in a plastic box or boxes comprising several discs.

The different surfaces of the body 1 have been shown flat in the accompanying drawings but it is within the scope of the present invention to have them open or to replace them by simple uprights constituting a frame.

As seen in the side views of FIGS. 2 and 3 or in the perspective view of FIG. 4, the edge 17 of the lateral longitudinal surfaces 10, which is opposite the bottom 13, is not rectilinear and the ends of said lateral longitudinal surfaces adjacent the transverse surface 11 are of a size substantially less than that of the near ends of the transverse wall 12. Similarly, the transverse surface 11 is of much less size than the transverse surface 12.

Figures 6, 7:
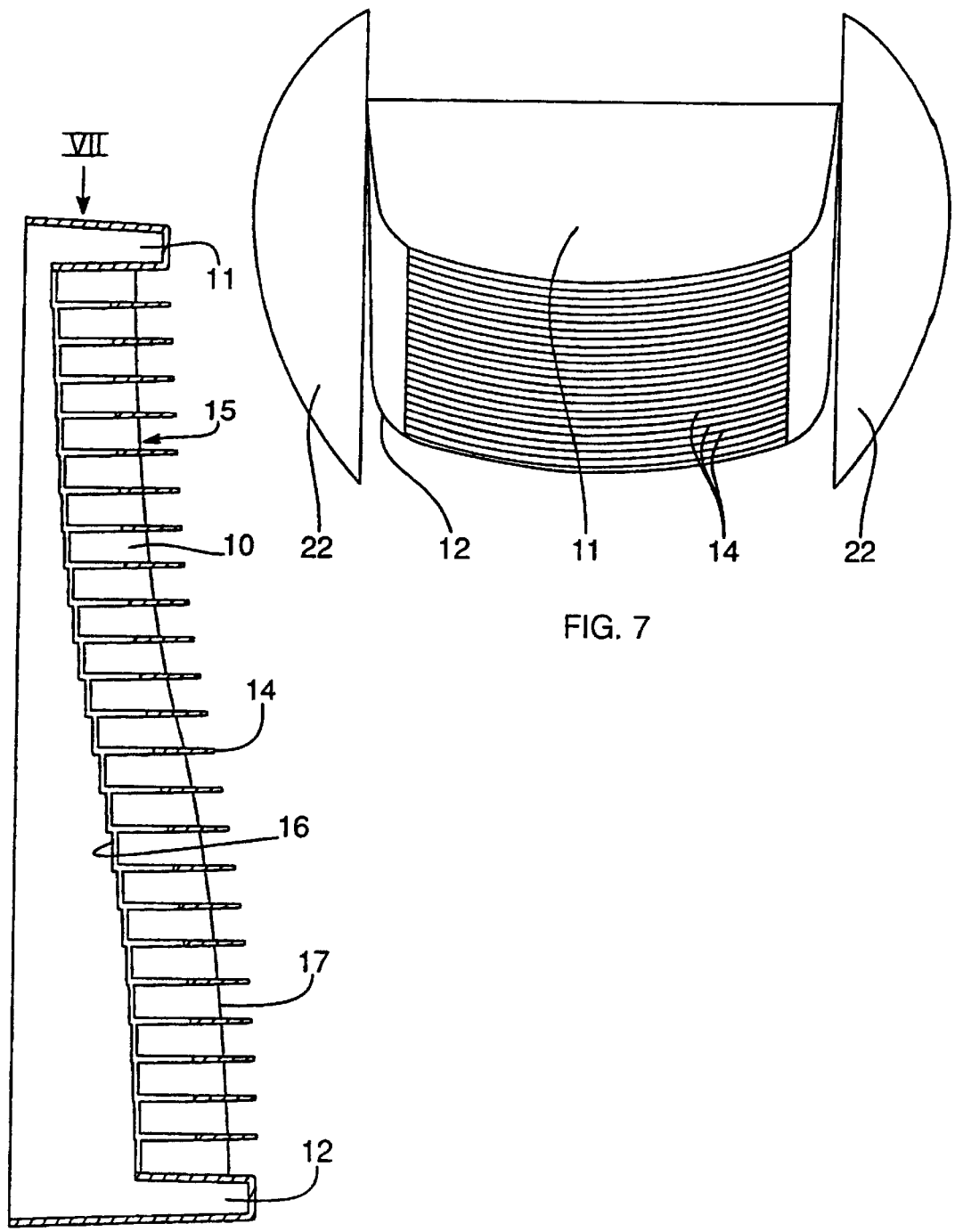
FIG. 6 is a longitudinal cross-sectional view of the body of a device according to the invention.
FIG. 7 is a view in the direction of the arrow VII of FIG. 6, of a body provided with two feet.

Moreover, as can be seen in FIG. 7, the separators 14 have a rounded contour at their free edge.

The bottoms 16 of the pockets created between the separators 14 are thus disposed such that the pockets will be of the same depth and the free edges of the separators will be on a curve parallel to the external edge 17 of the lateral longitudinal surfaces 10.

These arrangements permit giving a bulge to the body 1 that permits simulating the body of a living creature.

FIG. 6 shows an embodiment in which the body 1 is obtained by molding in the form of a hollow casing with thin walls. The bottom 13 of such a body 1 is thus constituted by the bottoms 16 of the pockets 15.

The body 1 can be used in vertical position as shown in FIGS. 1 and 3, by being positioned with either the small transverse surface 11 (FIGS. 1 and 2) or the large transverse surface 12 (FIG. 3) uppermost. The body 1 can also be used in a horizontal position as shown in FIG. 4, the head 20 being of course positioned either against the small transverse surface 11 or against the large transverse surface 12. In this latter case, an accessory representing a tail could be added to the transverse surface opposite the head to represent an animal. The bulge given to the body 1 permits simulating a prominent belly or bust.

So as to permit securement of accessories, the body 1 and said accessories carry hooking means 3 and 4 complementary to each other so as to permit easy assembly and disassembly.

Figure 5:
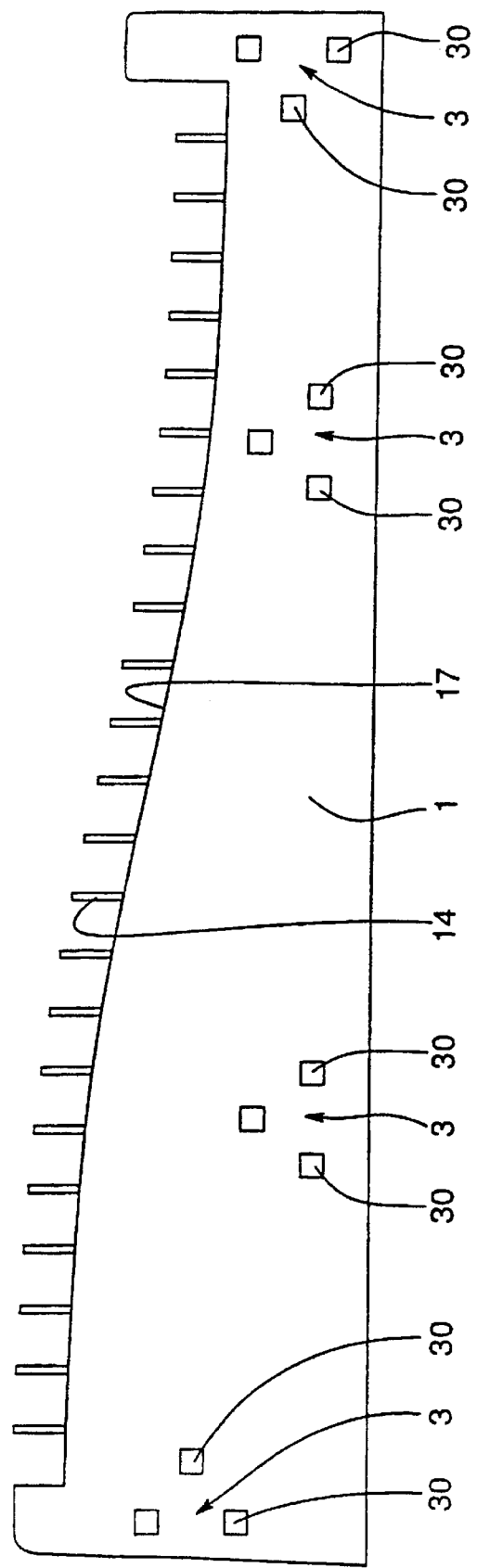
FIG. 5 is a side view of the body of a device according to the invention.

The hooking means carried by the body 1 are distributed over its lateral longitudinal or transverse surfaces. As seen in FIG. 5, more than two hooking means 3 are disposed on one lateral longitudinal surface 10 of the body so as to permit the positioning of the accessories forming upper members 21 or lower members 22 no matter whether the body is vertical or horizontal.

Figure 9:
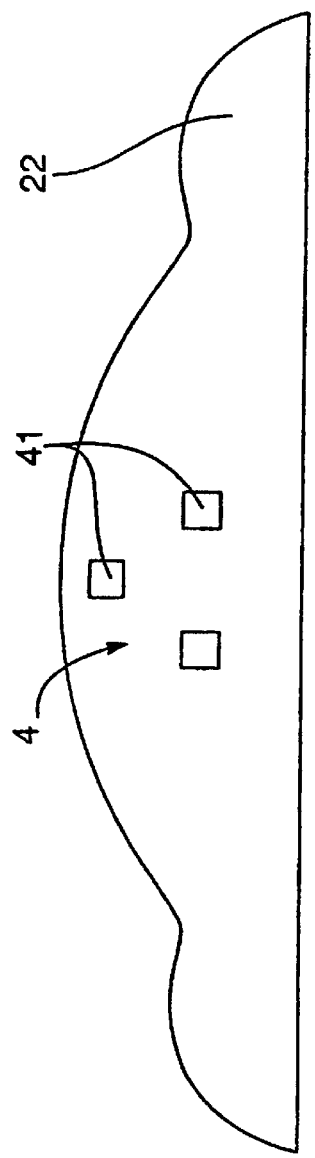
FIG. 9 is a view on the line IX—IX of FIG. 8, of the foot 22.
Figure 8:
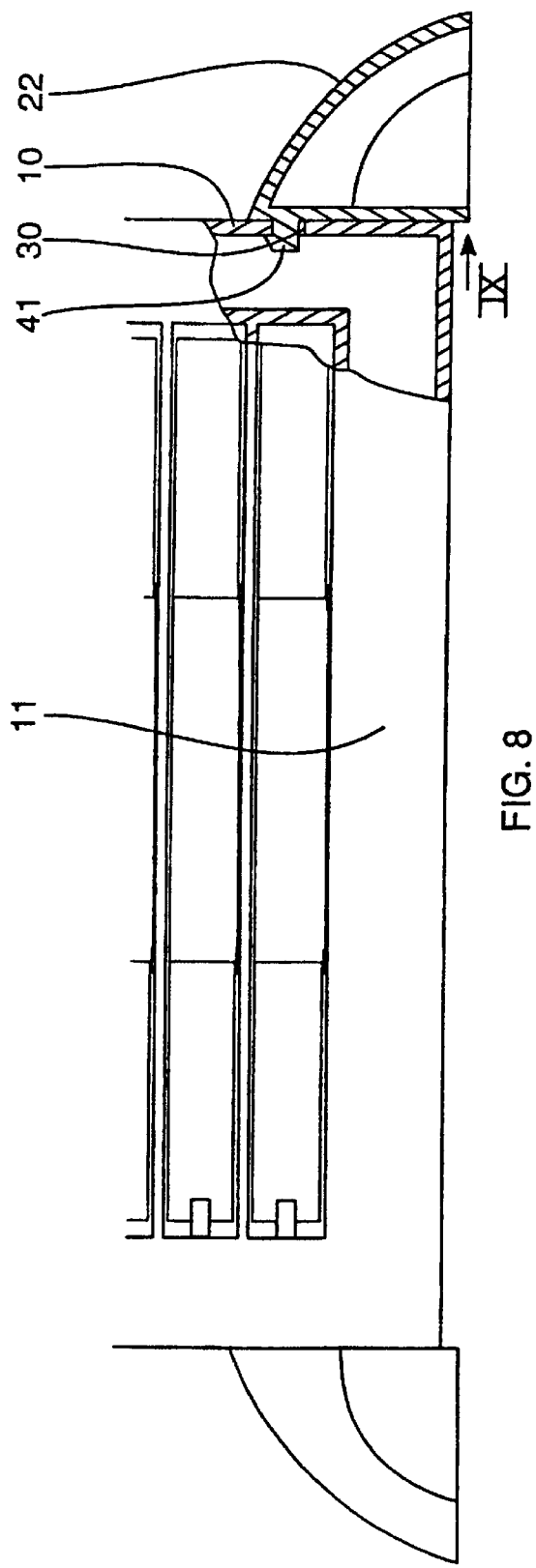
FIG. 8 is a view in fragmentary cross-section showing the base of a device according to the invention.

In the embodiment shown in FIGS. 5, 8 and 9, the hooking means 3 are constituted by three openings 30 disposed in a triangle and adapted to be traversed by three lugs 41 constituting the hooking means carried by the accessories, a foot 22 in FIGS. 8 and 9.

Other embodiments of hooking means can of course be used, such as means for snapping them in each other, or slideways.

What is claimed is:

1. A device for storing recording media, the device comprising:

plural removably attachable decorative accessories that give the device an appearance of a plaything; and a storage element that forms a body of the plaything and to which said decorative accessories are removably attached, said storage element having a generally rectangular recess for storing recording media that is defined by two sides that are arranged and adapted to restrict sideward movement of recording media in said recess, two ends, and a bottom that is arranged and adapted to restrict rearward movement of recording media in said recess, said recess having plural, spaced apart, recording media separators therein that are parallel to each other, wherein said separators have curved portions that extend from said recess to give the body of the plaything a rounded shape.

2. The device of claim 1, further comprising complementary male and female parts on said decorative accessories and said storage element that are arranged and adapted for the removable attachment of said decorative accessories.

3. The device of claim 2, wherein said complementary male and female parts snap together to removably attach said decorative accessories.

4. The device of claim 2, wherein said complementary male and female parts comprise plural holes and plural lugs.

5. The device of claim 1, wherein one of said two ends has a larger areal extent than the other said two ends.

6. The device of claim 5, further comprising complementary male and female parts on said decorative accessories and on said two sides of said storage element adjacent to said two ends, wherein two of said decorative accessories are arranged and adapted to support the device so that said storage element is generally upright, said complementary male and female parts on said sides of said storage element being arranged and adapted to receive said two of said decorative accessories adjacent to said one of said two ends and adjacent to said other of said two ends, whereby either of said two ends can be a topmost end of said recess.

7. A device for storing recording media, the device comprising:

plural removably attachable decorative accessories that give the device an appearance of a plaything;

a storage element that forms a body of the plaything and to which said decorative accessories are removably attached, said storage element having a generally rectangular recess for storing recording media that is defined by two sides that are arranged and adapted to restrict sideward movement of recording media in said recess, two ends, and a bottom that is arranged and adapted to restrict rearward movement of recording media in said recess, said recess having plural, spaced apart, recording media separators therein that are parallel to each other; and complementary male and female parts on said decorative accessories and said storage element that are arranged and adapted for the removable attachment of said decorative accessories, wherein said complementary male and female parts comprise plural holes and plural lugs, and wherein three of said holes and three of said lugs are arranged in respectively corresponding triangles.

8. A device for storing recording media, the device comprising:

plural removably attachable decorative accessories that give the device an appearance of a plaything; and a storage element that forms a body of the plaything and to which said decorative accessories are removably attached, said storage element having a generally rectangular recess for storing recording media that is defined by two sides that are arranged and adapted to restrict sideward movement of recording media in said recess, two ends, and a bottom that is arranged and adapted to restrict rearward movement of recording media in said recess, said recess having plural, spaced apart, recording media separators therein that are parallel to each other, wherein said bottom has plural steps.

9. The device of claim 8, wherein said separators are between each of said plural steps.

10. A device for storing recording media, the device comprising:

plural removably attachable decorative accessories that give the device an appearance of a plaything;

a storage element that forms a body of the plaything and to which said decorative accessories are removably attached, said storage element having a generally rectangular recess for storing recording media that is defined by two sides that are arranged and adapted to restrict sideward movement of recording media in said recess, two ends, and a bottom that is arranged and adapted to restrict rearward movement of recording media in said recess and that has plural steps, said recess having plural, spaced apart, recording media separators therein that are parallel to each other and that are between said plural steps; and complementary male and female parts on said decorative accessories and on said two sides of said storage element adjacent to said two ends, wherein two of said decorative accessories are arranged and adapted to support the device so that said storage element is generally upright, said complementary male and female parts on said sides of said storage element being arranged and adapted to receive said two of said decorative accessories adjacent to both of said two ends so that either of said two ends defines a topmost end of said recess.

11. The device of claim 10, wherein said complementary male and female parts snap together to removably attach said decorative accessories.

12. The device of claim 10, wherein said complementary male and female parts comprise plural holes and plural lugs.

13. The device of claim 12, wherein three of said holes and three of said lugs are arranged in respectively corresponding triangles.

14. The device of claim 10, wherein said separators have curved portions that extend from said recess to give the body of the plaything a rounded shape.

15. The device of claim 14, wherein one of said two ends has a larger areal extent than the other said two ends.

\* \* \* \* \*

UNITED STATES PATENT AND TRADEMARK OFFICE
CERTIFICATE OF CORRECTION

PATENT NO.    : 6,510,952 B1                                    Page 1 of 1
DATED         : January 28, 2003
INVENTOR(S)   : Paul-Henri Robert It is certified that error appears in the above-identified patent and that said Letters Patent is hereby corrected as shown below:

<u>Title page,</u>
Item [22], change "PCT filed Jul. 9, 1999" to -- PCT filed Jul. 7, 1999 --

Signed and Sealed this

Seventeenth Day of June, 2003

JAMES E. ROGAN
*Director of the United States Patent and Trademark Office*